United States Patent
Ziegler et al.

(10) Patent No.: US 11,912,864 B2
(45) Date of Patent: Feb. 27, 2024

(54) HIGH HEAT POLYCARBONATE COMPOSITIONS INCLUDING RECYCLED THERMOPLASTIC CONTENT

(71) Applicant: SHPP GLOBAL TECHNOLOGIES B.V., Bergen op Zoom (NL)

(72) Inventors: Christopher Ryan Ziegler, Selkirk, NY (US); Peter Vollenberg, Mt. Vernon, IN (US)

(73) Assignee: SHPP Global Technologies B.V., Bergen op Zoom (NL)

( * ) Notice: Subject to any disclaimer, the term of this patent is extended or adjusted under 35 U.S.C. 154(b) by 212 days.

(21) Appl. No.: 17/423,213

(22) PCT Filed: Jan. 17, 2020

(86) PCT No.: PCT/IB2020/050382
§ 371 (c)(1),
(2) Date: Jul. 15, 2021

(87) PCT Pub. No.: WO2020/148723
PCT Pub. Date: Jul. 23, 2020

(65) Prior Publication Data
US 2022/0064439 A1 Mar. 3, 2022

(30) Foreign Application Priority Data
Jan. 17, 2019 (EP) .................. 19152304

(51) Int. Cl.
*C08L 69/00* (2006.01)
*C08K 5/5399* (2006.01)
*C08K 7/14* (2006.01)

(52) U.S. Cl.
CPC ............ *C08L 69/00* (2013.01); *C08K 5/5399* (2013.01); *C08K 7/14* (2013.01); *C08L 2205/025* (2013.01); *C08L 2205/035* (2013.01); *C08L 2207/20* (2013.01)

(58) Field of Classification Search
None
See application file for complete search history.

(56) References Cited

U.S. PATENT DOCUMENTS

| | | |
|---|---|---|
| 2013/0313493 A1 | 11/2013 | Wen et al. |
| 2014/0107264 A1 | 4/2014 | Van Der Weele et al. |
| 2015/0011688 A1 | 1/2015 | An et al. |
| 2017/0313876 A1 | 11/2017 | Atkinson et al. |

FOREIGN PATENT DOCUMENTS

| | | |
|---|---|---|
| CN | 102471569 A | 5/2012 |
| CN | 104334638 A | 2/2015 |
| CN | 104718253 A | 6/2015 |
| CN | 104704059 B | 4/2017 |
| CN | 107531988 A | 1/2018 |
| CN | 109153775 A | 1/2019 |
| JP | 2015137307 A | 7/2015 |
| WO | 2016174592 A1 | 11/2016 |

OTHER PUBLICATIONS

International Search Report and Written Opinion for Application No. PCT/IB2020/050382, dated Mar. 23, 2020, 9 pages.

*Primary Examiner* — David J Buttner
(74) *Attorney, Agent, or Firm* — Quicker Law, LLC

(57) ABSTRACT

Thermoplastic compositions include: (a) from about 20 wt % to about 50 wt % post-consumer recycled polycarbonate (PCR-PC); (b) from about 5 wt % to about 25 wt % of a filler component; (c) from about 4 wt % to about 7 wt % of a phosphazene component; (d) from about 20 wt % to about 65 wt % of a polycarbonate copolymer component; and (e) from about 1 wt % to about 20 wt % one or more additional components. The polycarbonate copolymer component includes bisphenol-A and a monomer comprising one or more of 3,3-Bis(4-hydroxyphenyl)-2-phenyl-2,3-dihydro-isoindol-1-one (PPPBP), 4-4-(3-3-5 trimethylcyclohexane-1-ldiyl)diphenol (BPI), 4,4'-(1-Methyl Ethyl) 1-3-cyclohexandiyl) Bis-Phenol (BHPM), 1,1-Bis(4-hydroxy-3-methyl phenyl) cyclohexane (DMBPC); 4-[1-(4-hydroxyphenyl)cyclododecyl]phenol (Red Cross), bisphenol based on cyclooctadiene, bisphenol based on isophorone nitrile, and combinations thereof. The thermoplastic composition exhibits improved heat properties, including but not limited to heat deflection temperature.

14 Claims, No Drawings

HIGH HEAT POLYCARBONATE COMPOSITIONS INCLUDING RECYCLED THERMOPLASTIC CONTENT

CROSS-REFERENCE TO RELATED APPLICATION

This application is the National Stage of International Application No. PCT/IB2020/050382 filed Jan. 17, 2020, which claims priority to and the benefit of European Application No. 19152304.2 filed Jan. 17, 2019, the disclosures of which are incorporated herein by this reference in their entireties.

FIELD OF THE DISCLOSURE

The present disclosure relates to thermoplastic compositions including a high post-consumer recycled polycarbonate (PCR-PC) content, and in particular to PCR-PC compositions having improved high heat properties.

BACKGROUND OF THE DISCLOSURE

Polycarbonate compositions having high heat properties are desired in some consumer electronics applications in which the compositions are injection molded into articles. Specifically, high heat properties may allow the article to maintain part geometry during and after certain secondary processing steps, including coating applications, overmolding, surface modifications, curing steps, and others that generally carry an additional thermal/mechanical profile following injection molding. More specifically, in the consumer electronics market, there is an interest in higher heat polycarbonate resins that would allow processors an opportunity to cure liquid silicone rubber compositions at higher temperatures, resulting in a more rapid and more complete cure without unacceptable part deformation or degradation, while also benefitting from the excellent mechanical properties that polycarbonate resins generally offer. Moreover, it is increasingly desirable for plastic compositions to include recycled content (post-consumer, post-industrial, etc.). A requirement to include larger amounts of recycled polycarbonate could limit the amount of other additives and fillers that can be included in the composition in order to achieve desired composition properties.

If recycled plastic content is not required, high heat thermoplastics have generally been achieved by using a higher heat thermoplastic resin as the main component, by blending a higher heat thermoplastic resin into the composition, or to a lesser extent by modifying the formulation. Specifically for polycarbonate, higher heat performance has been obtained by including 3,3-Bis(4-hydroxyphenyl)-2-phenyl-2,3-dihydro-isoindol-1-one (PPPBP) monomer during the polycarbonate polymerization process to form a polycarbonate copolymer, and then blending the polycarbonate copolymer with virgin polycarbonate resin. Such copolymers are available from SABIC under the XHT line of products. Polycarbonate compositions including the PC-copolymer such as that described above can have good heat properties, but they do not include recycled plastic content.

These and other shortcomings are addressed by aspects of the disclosure.

SUMMARY

Aspects of the disclosure relate to thermoplastic compositions including: (a) from about 20 wt % to about 50 wt % post-consumer recycled polycarbonate (PCR-PC); (b) from about 5 wt % to about 25 wt % of a filler component; (c) from about 4 wt % to about 7 wt % of a phosphazene component; (d) from about 20 wt % to about 65 wt % of a polycarbonate copolymer component; and (e) from about 1 wt % to about 20 wt % one or more additional components. The polycarbonate copolymer component includes bisphenol-A and a monomer including one or more of 3,3-Bis(4-hydroxyphenyl)-2-phenyl-2,3-dihydro-isoindol-1-one (PPPBP), 4-4-(3-3-5 trimethylcyclohexane-1-1diyl)diphenol (BPI), 4,4'-(1-Methyl Ethyl) 1-3-cyclohexandiyl) Bis-Phenol (BHPM), 1,1-Bis(4-hydroxy-3-methyl phenyl) cyclohexane (DMBPC); 4-[1-(4-hydroxyphenyl)cyclodo-decyl]phenol (Red Cross), bisphenol based on cyclooctadiene, bisphenol based on isophorone nitrile, and combinations thereof. The thermoplastic composition exhibits improved heat properties, including but not limited to heat deflection temperature.

DETAILED DESCRIPTION

The present disclosure can be understood more readily by reference to the following detailed description of the disclosure and the Examples included therein. In various aspects, the present disclosure pertains to thermoplastic compositions including: (a) from about 20 wt % to about 50 wt % post-consumer recycled polycarbonate (PCR-PC); (b) from about 5 wt % to about 25 wt % of a filler component; (c) from about 4 wt % to about 7 wt % of a phosphazene component; (d) from about 20 wt % to about 65 wt % of a polycarbonate copolymer component; and (e) from about 1 wt % to about 20 wt % one or more additional components. The polycarbonate copolymer component includes bisphenol-A and a monomer including one or more of 3,3-Bis(4-hydroxyphenyl)-2-phenyl-2,3-dihydro-isoindol-1-one (PPPBP), 4-4-(3-3-5 trimethylcyclohexane-1-1diyl)diphenol (BPI), 4,4'-(1-Methyl Ethyl) 1-3-cyclohexandiyl) Bis-Phenol (BHPM), 1,1-Bis(4-hydroxy-3-methyl phenyl) cyclohexane (DMBPC); 4-[1-(4-hydroxyphenyl)cyclodo-decyl]phenol (Red Cross), bisphenol based on cyclooctadiene, bisphenol based on isophorone nitrile, and combinations thereof. In an aspect, the thermoplastic composition exhibits improved heat properties, including but not limited to heat deflection temperature.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting.

Various combinations of elements of this disclosure are encompassed by this disclosure, e.g., combinations of elements from dependent claims that depend upon the same independent claim.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

All publications mentioned herein are incorporated herein by reference to disclose and describe the methods and/or materials in connection with which the publications are cited.

Definitions

It is also to be understood that the terminology used herein is for the purpose of describing particular aspects only and is not intended to be limiting. As used in the specification and in the claims, the term "comprising" can include the aspects "consisting of" and "consisting essentially of" Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a polycarbonate-siloxane copolymer" includes mixtures of two or more polycarbonate-siloxane polymers.

As used herein, the term "combination" is inclusive of blends, mixtures, alloys, reaction products, and the like.

Ranges can be expressed herein as from one value (first value) to another value (second value). When such a range is expressed, the range includes in some aspects one or both of the first value and the second value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the designated value, approximately the designated value, or about the same as the designated value. It is generally understood, as used herein, that it is the nominal value indicated±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optional flame retardant component" means that the flame retardant component can or cannot be included and that the description includes compositions that both include and that do not include the flame retardant component.

Disclosed are the components to be used to prepare the compositions of the disclosure as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

References in the specification and concluding claims to parts by weight of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

As used herein, the terms "number average molecular weight" or "Mn" can be used interchangeably, and refer to the statistical average molecular weight of all the polymer chains in the sample and is defined by the formula:

$$M_n = \frac{\sum N_i M_i}{\sum N_i},$$

where Mi is the molecular weight of a chain and Ni is the number of chains of that molecular weight. Mn can be determined for polymers, e.g., polycarbonate polymers, by methods well known to a person having ordinary skill in the art using molecular weight standards, e.g. polycarbonate standards or polystyrene standards, preferably certified or traceable molecular weight standards.

As used herein, the terms "weight average molecular weight" or "Mw" can be used interchangeably, and are defined by the formula:

$$M_w = \frac{\sum N_i M_i^2}{\sum N_i M_i},$$

where Mi is the molecular weight of a chain and Ni is the number of chains of that molecular weight. Compared to Mn, Mw takes into account the molecular weight of a given chain in determining contributions to the molecular weight average. Thus, the greater the molecular weight of a given chain, the more the chain contributes to the Mw. Mw can be determined for polymers, e.g., polycarbonate polymers, by methods well known to a person having ordinary skill in the art using molecular weight standards, e.g., polycarbonate standards or polystyrene standards, preferably certified or traceable molecular weight standards.

As used herein, the terms "polydispersity index" or "PDI" can be used interchangeably, and are defined by the formula:

$$PDI = \frac{M_w}{M_n}.$$

The PDI has a value equal to or greater than 1, but as the polymer chains approach uniform chain length, the PDI approaches unity.

The terms "BisA," "BPA," or "bisphenol A," which can be used interchangeably, as used herein refers to a compound having a structure represented by the formula:

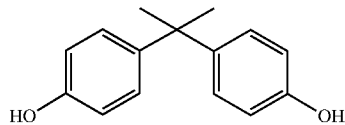 [SMILES: CC(C)(c1ccc(O)cc1)c1ccc(O)cc1]

BisA can also be referred to by the name 4,4'-(propane-2, 2-diyl)diphenol; p,p'-isopropylidenebisphenol; or 2,2-bis(4-hydroxyphenyl)propane. BisA has the CAS #80-05-7.

As used herein, "polycarbonate" refers to an oligomer or polymer including residues of one or more dihydroxy compounds, e.g., dihydroxy aromatic compounds, joined by carbonate linkages; it also encompasses homopolycarbonates, copolycarbonates, and (co)polyester carbonates.

The terms "residues" and "structural units", used in reference to the constituents of the polymers, are synonymous throughout the specification.

As used herein the terms "weight percent," "wt %," and "wt. %," which can be used interchangeably, indicate the percent by weight of a given component based on the total weight of the composition, unless otherwise specified. That is, unless otherwise specified, all wt % values are based on the total weight of the composition. It should be understood that the sum of wt % values for all components in a disclosed composition or formulation are equal to 100.

Unless otherwise stated to the contrary herein, all test standards are the most recent standard in effect at the time of filing this application.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions and it is understood that there are a variety of structures that can perform the same function that are related to the disclosed structures, and that these structures will typically achieve the same result.

Thermoplastic Compositions Including PCR-PC

Aspects of the disclosure relate to a thermoplastic composition including: (a) from about 20 wt % to about 50 wt % post-consumer recycled polycarbonate (PCR-PC); (b) from about 5 wt % to about 25 wt % of a filler component; (c) from about 4 wt % to about 7 wt % of a phosphazene component; (d) from about 20 wt % to about 65 wt % of a polycarbonate copolymer component; and (e) from about 1 wt % to about 20 wt % one or more additional components. The polycarbonate copolymer component includes bisphenol-A and a monomer including one or more of 3,3-Bis(4-hydroxyphenyl)-2-phenyl-2,3-dihydro-isoindol-1-one (PPPBP), 4-4-(3-3-5 trimethylcyclohexane-1-1diyl)diphenol (BPI), 4,4'-(1-Methyl Ethyl) 1-3-cyclohexandiyl) Bis-Phenol (BHPM), 1,1-Bis(4-hydroxy-3-methyl phenyl) cyclohexane (DMBPC); 4-[1-(4-hydroxyphenyl)cyclodo-decyl]phenol (Red Cross), bisphenol based on cyclooctadiene, bisphenol based on isophorone nitrile, and combinations thereof.

The PCR-PC is a post-consumer recycled polycarbonate derived or reclaimed from a polycarbonate ("PCR-PC") as described herein. The PCR-PC can be reclaimed from post-consumer sources. Yet further, the PCR-PC can be reclaimed from post-consumer sources, including but not limited to, home appliances waste e.g. TV, air-conditioners, washing machines, refrigerators, and like. Regardless of the source, the recycled polycarbonate component may be similar or even identical to the chemical composition of a corresponding virgin polycarbonate. In one example, the polycarbonate may be derived from compact discs. In a further example, the PCR-PC may be sourced from plastic bottles, such as plastic beverage bottles. In contrast, a virgin polycarbonate polymer refers to a polycarbonate polymer that is directly produced from a petrochemical feedstock, such as natural gas or crude oil, which has never been used or processed before.

One possible difference between the virgin polycarbonate component and PCR-PC utilized in the present compositions is the presence of at least one impurity that is not present in a virgin material. For example, one or more additives conventionally used in the manufacture of impact modified thermoplastics can be present as an impurity. Additional impurities can include processing residues such as lubricants, mold release agents, antistatic agents, stabilizers, light stabilizers, flame retardants, metals (e.g. iron, aluminum, and copper). Still further, the impurities can include polyurethane particles that cannot be fully removed during the recycling process. In some aspects the impurity content in the PCR-PC is less than about 5 wt %, or in other aspects less than about 3 wt %, or in further aspects less than about 2 wt %. The impurities, if present, do not appreciably affect the properties of the compositions described herein.

The disclosed composition may include from about 20 wt % to about 50 wt % PCR-PC. In particular aspects, the composition includes from about 30 wt % to about 50 wt % PCR-PC, and in further aspects the composition includes from about 40 wt % to about 50 wt % PCR-PC.

In yet further aspects the compositions may include virgin PC in addition to PCR-PC.

The filler component can include any suitable filler material. Examples include, but are not limited to, glass fibers and carbon fibers. In particular aspects the filler component includes glass fibers. Exemplary glass fibers include those including, but not limited to, E-glass, S-glass, AR-glass, T-glass, D-glass and R-glass. The glass fibers may be round or flat. The glass fibers may be sized or unsized. Sized glass fibers are coated on their surfaces with a sizing composition selected for compatibility with the polymeric base resin. The sizing composition facilitates wet-out and wet-through of the PCR-PC upon the fiber strands and assists in attaining desired physical properties in the thermoplastic composition. In some aspects the thermoplastic composition includes about 5 wt % to about 25 wt % of the filler component, or from about 10 wt % to about 20 wt % of the filler component in particular aspects.

The thermoplastic composition includes from about 4 wt % to about 7 wt % of a phosphazene component. A phosphazene is an organic compound having a —P=N— bond in the molecule. The phosphazene component provides flame retardant properties to the thermoplastic composition in some aspects. An exemplary phosphazene compound suitable for use in the phosphazene component is Rabitle FP-100T, available from Fushimi. In certain aspects the thermoplastic composition includes about 5 wt % of the phosphazene component.

The thermoplastic composition also includes from about 20 wt % to about 65 wt % of a polycarbonate copolymer component. In some aspects the polycarbonate copolymer component includes BPA and 3,3-Bis(4-hydroxyphenyl)-2-phenyl-2,3-dihydro-isoindol-1-one (PPPBP). One exemplary polycarbonate copolymer is 3,3-Bis(4-hydroxyphenyl)-2-phenyl-2,3-dihydro-isoindol-1-one/poly(bisphenol A) (PPPBP/BPA) copolycarbonate, CAS Reg. No. 503834-43-3, having about 33 wt % PPPBP and about 67 wt % BPA and a weight average molecular weight of about 25,000 Daltons, as determined by gel permeation chromatography using polycarbonate standards. The polycarbonate copolymer is available from SABIC under the XHT line of products. The polycarbonate copolymer need not have 33 wt % PPPBP and 67 wt % BPA as described above; other relative amounts are possible in the polycarbonate copolymer, including from about 15 wt % to about 50 wt % PPPBP and from about 50 wt % to about 85 wt % BPA.

In further aspects the polycarbonate copolymer component may include one or more of the following monomers: 4-4-(3-3-5 trimethylcyclohexane-1-1diyl)diphenol (BPI); 4,4'-(1-Methyl Ethyl) 1-3-cyclohexandiyl) Bis-Phenol (BHPM); 1,1-Bis(4-hydroxy-3-methyl phenyl) cyclohexane (DMBPC); 4-[1-(4-hydroxyphenyl)cyclododecyl]phenol (Red Cross); bisphenol based on cyclooctadiene; and bisphenol based on isophorone nitrile. The polycarbonate copolymer component may include any amount of these monomers.

The thermoplastic composition further includes from about 1 wt % to about 20 wt % one or more additional components.

In particular aspects the one or more additional components includes a polycarbonate-siloxane copolymer. Non-limiting examples of the polysiloxane-polycarbonate copolymer can include various copolymers available from SABIC. The polysiloxane-polycarbonate copolymer can include any desirable siloxane content. In some aspects the polysiloxane-polycarbonate copolymer contains 20% by weight polysiloxane based upon the total weight of the polysiloxane block copolymer. For example, a suitable polysiloxane-polycarbonate copolymer can be a polysiloxane-co-BPA polycarbonate copolymer end-capped with para-cumyl phenol (PCP) and having a 20% polysiloxane content (see C9030P, commercially available from SABIC as EXL C9030P). In further aspects the polysiloxane-polycarbonate copolymer contains from about 5 wt % to about 45 wt % polysiloxane, or about 6 wt %, or about 40 wt %, based upon the total weight of the polysiloxane block copolymer.

In some aspects, two or more polycarbonate-siloxane copolymers may be used. For example, in some aspects, blends of end-capped and hydroxy terminated materials may be used. In other aspects, blends of similar chemistries having different proportions of siloxane may also be used. The disclosed polycarbonate-siloxane copolymer block copolymers can also be end-capped. For example, according to aspects of the disclosure, a polycarbonate-siloxane copolymer block copolymer can be end capped with p-cumyl-phenol.

The polycarbonate-siloxane copolymer component can be present in the thermoplastic composition in any desired amount within the ranges prescribed herein, including exemplary amounts of greater than 0 wt % to about 15 wt % in some aspects, or in further aspects from greater than 0 wt % to about 12 wt % or from about 1 wt % to about 7 wt %.

In some aspects the one or more additional components includes a transparent and flame resistant polycarbonate copolymer. In one aspect the transparent and flame resistant polycarbonate copolymer includes a poly(aliphatic ester)-polycarbonate. Another examples include, but are not limited to, a linear homopolymer containing bisphenol A carbonate units (BPA-PC), and a branched, cyanophenol end-capped bisphenol A homopolycarbonate produced via interfacial polymerization, containing about 3 mol % 1,1,1-tris(4-hydroxyphenyl)ethane (THPE) branching agent, commercially available under the trade name CFR from SABIC. The transparent and flame resistant polycarbonate copolymer may be present in the thermoplastic composition in any suitable amount, including from greater than 0 wt % to about 15 wt %, or from about 5 wt % to about 10 wt %. In certain aspects the thermoplastic composition does not include a transparent and flame resistant polycarbonate copolymer.

The one or more additional component may include an anti-drip component in some aspects. The anti-drip component may include, but is not limited to, a polytetrafluoroethylene (PTFE)-styrene-acrylonitrile resin (T-SAN) resin such as INP449 available from SABIC. The anti-drip agent may provide further flame resistance to the thermoplastic composition and prevent or minimize dripping of the composition when exposed to flame. The anti-drip component may be present in the thermoplastic composition in an amount of greater than 0 wt % to about 2 wt % in some aspects, or in further aspects from greater than 0 wt % to about 1 wt %.

The one or more additional component may include an additional flame retardant component in some aspects. The additional flame retardant component may include, but is not limited to, a component including silicone. The term "silicone" as used herein is generic for a wide range of polysiloxane materials which can be advantageously utilized in the thermoplastic compositions of the present disclosure. In particular aspects the additional flame retardant component includes silicone oil, such as but not limited to SFR100, available from Momentive. The additional flame retardant component may be present in the thermoplastic composition in an amount of greater than 0 wt % to about 2 wt % in some aspects, or in further aspects from greater than 0 wt % to about 1 wt %.

The one or more additional component may include in certain aspects other additives used in thermoplastic compositions similar to those described herein. Exemplary additives include, but are not limited to, a pigment, a whitening agent, an optical brightener, a surfactant, a processing aid, a thermal stabilizer, a photochemical stabilizer, a mold-release agent, an antioxidant, and combinations thereof.

Properties of the Thermoplastic Composition

Thermoplastic compositions according to aspects described herein have improved properties as compared to similar compositions that do not include the polycarbonate copolymer component. In particular, the thermoplastic compositions may have a higher heat deflection temperature (HDT) than similar compositions that do not include the polycarbonate copolymer component. The thermoplastic compositions may also have good flame resistance properties.

Accordingly, in some aspects the thermoplastic composition has a HDT as measured in accordance with ASTM D648 using a 3.2 millimeter (mm) sample at a load of 0.45 megapascals (MPa) that is at least about 5 degrees Celsius (° C.) higher than that of a substantially identical thermoplastic composition that does not include the polycarbonate copolymer component. In further aspects the thermoplastic composition has a HDT as measured in accordance with ASTM D648 using a 3.2 millimeter (mm) sample at a load of 0.45 megapascals (MPa) that is at least about 10° C. higher, or at least about 15° C. higher, than that of a substantially identical thermoplastic composition that does not include the polycarbonate copolymer component. As used herein a "substantially identical thermoplastic composition that does not include the polycarbonate copolymer component" is a comparative composition that includes the same components as the inventive composition, except that the comparative composition does not include the polycarbonate copolymer component. Moreover, the content of the polycarbonate copolymer component not included in the comparative composition is replaced with additional PCR-PC.

In other aspects the thermoplastic composition has a HDT of at least about 120° C. as measured in accordance with ASTM D648 using a 3.2 mm sample at a load of 0.45 MPa. In certain aspects the thermoplastic composition has a HDT of at least about 125° C., or at least about 130° C., as measured in accordance with ASTM D648 using a 3.2 mm sample at a load of 0.45 MPa.

The thermoplastic composition may also be flame resistant. In particular aspects, the thermoplastic composition has a UL94 flammability rating of V0 when exposed to short-term conditioning conditions. Short-term conditioning conditions are described in UL94, and include exposing the composition to a temperature of 23±2° C. in air having a relative humidity (RH) of 50±5% for 48 hours.

The high heat properties of the thermoplastic composition allow for use of the composition to injection mold articles that do not deform during Liquid Silicone Rubber (LSR) overmolding processes. Generally, the minimum temperature for curing LSR is approximately 100° C., but can go as high as 200° C. or even 300° C. for certain LSR systems. Compositions having an HDT that is improved by at least about 5° C. as compared to this composition would be desirable to provide a more satisfactory LSR cure, resulting in a more cross-linked network and/or a shorter LSR cycle time. In addition, the thermoplastic compositions described herein may have comparable mechanical and UL (flammability) performance as compared to comparative compositions that do not include the polycarbonate copolymer component, while also allowing for the use of up to about 50 wt % post-consumer recycled polycarbonate (PCR-PC).

Methods of Manufacture

The one or any foregoing components described herein may be first dry blended with each other, or dry blended with any combination of foregoing components, then fed into an extruder from one or multi-feeders, or separately fed into an extruder from one or multi-feeders. The fillers used in the invention may also be first processed into a masterbatch, then fed into an extruder. The components may be fed into the extruder from a throat hopper or any side feeders.

The extruders used in the invention may have a single screw, multiple screws, intermeshing co-rotating or counter rotating screws, non-intermeshing co-rotating or counter rotating screws, reciprocating screws, screws with pins, screws with screens, barrels with pins, rolls, rams, helical rotors, co-kneaders, disc-pack processors, various other types of extrusion equipment, or combinations comprising at least one of the foregoing.

The components may also be mixed together and then melt-blended to form the thermoplastic compositions. The melt blending of the components involves the use of shear force, extensional force, compressive force, ultrasonic energy, electromagnetic energy, thermal energy or combinations comprising at least one of the foregoing forces or forms of energy.

The barrel temperature on the extruder during compounding can be set at the temperature where at least a portion of the polycarbonate has reached a temperature greater than or equal to about the melting temperature, if the resin is a semi-crystalline organic polymer, or the flow point (e.g., the glass transition temperature) if the resin is an amorphous resin.

The mixture including the foregoing mentioned components may be subject to multiple blending and forming steps if desirable. For example, the thermoplastic composition may first be extruded and formed into pellets. The pellets may then be fed into a molding machine where it may be formed into any desirable shape or product. Alternatively, the thermoplastic composition emanating from a single melt blender may be formed into sheets or strands and subjected to post-extrusion processes such as annealing, uniaxial or biaxial orientation.

The temperature of the melt in the present process may in some aspects be maintained as low as possible in order to avoid excessive thermal degradation of the components. In certain aspects the melt temperature is maintained between about 230° C. and about 350° C., although higher temperatures can be used provided that the residence time of the resin in the processing equipment is kept relatively short. In some aspects the melt processed composition exits processing equipment such as an extruder through small exit holes in a die. The resulting strands of molten resin may be cooled by passing the strands through a water bath. The cooled strands can be chopped into pellets for packaging and further handling.

Articles of Manufacture

In certain aspects, the present disclosure pertains to shaped, formed, or molded articles comprising the thermoplastic compositions. The thermoplastic compositions can be molded into useful shaped articles by a variety of means such as injection molding, extrusion, rotational molding, blow molding and thermoforming to form articles and structural components of, for example, personal or commercial electronics devices, including but not limited to cellular telephones, tablet computers, personal computers, notebook and portable computers, and other such equipment, medical applications, RFID applications, automotive applications, and the like. In a further aspect, the article is extrusion molded. In a still further aspect, the article is injection molded.

Various combinations of elements of this disclosure are encompassed by this disclosure, e.g., combinations of elements from dependent claims that depend upon the same independent claim.

Aspects of the Disclosure

In various aspects, the present disclosure pertains to and includes at least the following aspects.

Aspect 1. A thermoplastic composition comprising:
(a) from about 20 wt % to about 50 wt % post-consumer recycled polycarbonate (PCR-PC);
(b) from about 5 wt % to about 25 wt % of a filler component;
(c) from about 4 wt % to about 7 wt % of a phosphazene component;
(d) from about 20 wt % to about 65 wt % of a polycarbonate copolymer component comprising bisphenol-A and a monomer comprising one or more of 3,3-Bis(4-hydroxyphenyl)-2-phenyl-2,3-dihydro-isoindol-1-one (PPPBP), 4-4-(3-3-5 trimethylcyclohexane-1-1diyl)diphenol (BPI), 4,4'-(1-Methyl Ethyl) 1-3-cyclohexandiyl) Bis-Phenol (BHPM), 1,1-Bis(4-hydroxy-3-methyl phenyl) cyclohexane (DMBPC); 4-[1-(4-hydroxyphenyl)cyclododecyl]phenol (Red Cross), bisphenol based on cyclooctadiene, bisphenol based on isophorone nitrile, and combinations thereof, and
(e) from about 1 wt % to about 20 wt % one or more additional components.

Aspect 2. The thermoplastic composition according to Aspect 1, wherein the thermoplastic composition comprises a heat deflection temperature as measured in accordance with ASTM D648 using a 3.2 millimeter (mm) sample at a load of 0.45 megapascals (MPa) that is at least about 10 degrees Celsius (° C.) higher than that of a substantially identical thermoplastic composition that does not include the polycarbonate copolymer component.

Aspect 3. The thermoplastic composition according to Aspect 1 or 2, wherein the thermoplastic composition comprises a heat deflection temperature of at least about 130° C. as measured in accordance with ASTM D648 using a 3.2 mm sample at a load of 0.45 MPa.

Aspect 4. The thermoplastic composition according to any of Aspects 1 to 3, wherein the thermoplastic composition comprises a UL94 flammability rating of V0 when exposed to short-term conditioning conditions.

Aspect 5. The thermoplastic composition according to any of Aspects 1 to 4, wherein the filler component comprises glass fibers.

Aspect 6. The thermoplastic composition according to any of Aspects 1 to 5, wherein the composition comprises from about 10 wt % to about 20 wt % of the filler component.

Aspect 7. The thermoplastic composition according to any of Aspects 1 to 6, wherein the PCR-PC comprises a recycled polycarbonate derived or reclaimed from a polycarbonate.

Aspect 8. The thermoplastic composition according to any of Aspects 1 to 7, wherein the composition comprises about 5 wt % of the phosphazene component.

Aspect 9. The thermoplastic composition according to any of Aspects 1 to 8, wherein the one or more additional components comprise a polycarbonate-siloxane copolymer.

Aspect 10. The thermoplastic composition according to any of Aspects 1 to 9, wherein the one or more additional components comprise a transparent and flame resistant polycarbonate copolymer.

Aspect 11. The thermoplastic composition according to any of Aspects 1 to 10, wherein the one or more additional components comprise an anti-drip component.

Aspect 12. The thermoplastic composition according to any of Aspects 1 to 11, wherein the one or more additional components comprise an additional flame retardant component.

Aspect 13. The thermoplastic composition according to any of Aspects 1 to 12, wherein the one or more additional components is selected from the group consisting of a pigment; a whitening agent; an optical brightener; a surfactant; a processing aid; a thermal stabilizer; a photochemical stabilizer; a mold-release agent; an antioxidant; and combinations thereof.

Aspect 14. An article comprising the thermoplastic composition according to any of Aspects 1 to 13.

Aspect 15. The article according to Aspect 14, wherein the article is a component of a consumer electronics device.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. Unless indicated otherwise, percentages referring to composition are in terms of wt %.

There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

Compositions including PC and various levels of polycarbonate copolymer including polycarbonate and 3,3-Bis (4-hydroxyphenyl)-2-phenyl-2,3-dihydro-isoindol-1-one (PPPBP) (XHT copolymer) were produced. Note that virgin PC was used in all examples due to unavailability of PCR-PC; it is expected that compositions including PCR-PC will have similar properties as those including the same amount of virgin PC. The high flow PC in the examples is LEXAN™ ML5221 PC; the low flow PC in the examples is PC100 polycarbonate. Both are available from SABIC. PCR-PC from sources such as digital media (e.g., compact disc) scrap has a relatively high flow while PCR-PC from sources such as water bottles has a relatively lower flow. The compositions and several properties were tested and shown in Table 1.

TABLE 1

XHT level variation (0-20%)

| Component (wt %) | C1.1 | C1.2 | Ex1.1 | Ex1.3 | Ex1.3 |
|---|---|---|---|---|---|
| PC (high flow) | 41.2 | 41.2 | 41.2 | 41.2 | 36.2 |
| PC (low flow) | 15.00 | 15.00 | 5.00 | | |
| LEXAN ™ CFR copolymer (SABIC) | 10 | 10 | 10 | 10 | 10 |
| LEXAN ™ EXL copolymer (SABIC) | 6 | 6 | 6 | 6 | 6 |
| XHT high heat copolymer (SABIC) | 0 | 0 | 10 | 15 | 20 |
| Phosphazene flame retardant | 6.50 | 6.50 | 6.50 | 6.50 | 6.50 |
| Glass fiber (14 μm) | 20 | | 20 | 20 | 20 |
| Flat glass fiber | | 20 | | | |
| T-SAN anti drip resin, INP449 (SABIC) | 0.6 | 0.6 | 0.6 | 0.6 | 0.6 |
| Pentaerythritoltetrastearate (PETS) processing aid | 0.5 | 0.5 | 0.5 | 0.5 | 0.5 |
| Irganox 1076 processing aid (AO1076) | 0.1 | 0.1 | 0.1 | 0.1 | 0.1 |
| Tris-isobutylated triphenyl phosphate (TBPP) processing aid | 0.1 | 0.1 | 0.1 | 0.1 | 0.1 |
| Properties | | | | | |
| Predicted Recycle Content, % | 56 | 56 | 46 | 41 | 36 |
| Δheat v. C1.2, ° C. | — | 2 | 4 | 9 | 10 |
| UL94 VX @ 0.75 mm | V0 | V0 | V0 | V0 | V0 |
| HDT-Avg (1.8 MPa), ° C. | 115.4 | 118.8 | 119.3 | 124 | 125.6 |
| HDT-Avg (0.45 MPa), ° C. | 120.4 | 122.9 | 124.5 | 129.2 | 130.9 |
| Impact Strength-Avg (N, 5J), J/m | 73.3 | 103 | 67.5 | 72.6 | 72.3 |
| Tensile Strength at Break-Avg, MPa | 74.3 | 84.7 | 76.6 | 73.2 | 75 |
| Nominal Strain at Break-Avg, % | 3.13 | 3.39 | 3.09 | 3.27 | 3.29 |

Comparative composition C1.2 is a polycarbonate product that does not include the polycarbonate copolymer component. To increase the heat of C1.2 and maintain room to include suitable amounts of PCR-PC (predicted), the content of high heat copolymer (PC including PPPBP (XHT)) (Table 1) and/or phosphazene (Table 2) was varied. In Table 1, high heat copolymer (XHT) content was varied from 0 to 200% loading (at the expense of PC content) and HDT was observed to increase by as much as around 10° C. In addition, the UL94 V0 rating for flame resistance and mechanical performance of the compositions were maintained. Accordingly, from these examples it was seen that a HDT increase of around 10° C. was possible while maintaining a high predicted PCR-PC content (about 360%) and maintaining flammability and mechanical performance.

The effect of varying content of phosphazene and including other flame retardant salts was considered; results are shown in Tables 2A and 2B3.

TABLE 2A

Phosphazene and Other FR Content

| Component (wt %) | C2.1 | C2.2 | C2.3 | C2.4 | C2.5 | Ex2.1 |
|---|---|---|---|---|---|---|
| PC (high flow) | 41.2 | 41.2 | 41.2 | 41.2 | 41.2 | 41.2 |
| PC (low flow) | 6.50 | 6.20 | 6.44 | 5.20 | 5.44 | 2.95 |
| CFR copolymer | 10 | 10 | 10 | 10 | 10 | 10 |
| EXL copolymer | 6 | 6 | 6 | 6 | 6 | 6 |
| XHT copolymer | 15 | 15 | 15 | 15 | 15 | 15 |
| Phosphazene FR | 0.00 | 0.00 | 0.00 | 1.00 | 1.00 | 3.25 |
| RIMAR salt flame retardant | | | 0.06 | | 0.06 | |
| 3-phenylsulfonylbenezenesulfonic acid potassium salt (KSS) flame retardant | | 0.3 | | 0.3 | | 0.3 |
| Glass fiber (14 μm) | 20 | 20 | 20 | 20 | 20 | 20 |
| Flat glass fiber | | | | | | |
| INP449 | 0.6 | 0.6 | 0.6 | 0.6 | 0.6 | 0.6 |
| PETS | 0.5 | 0.5 | 0.5 | 0.5 | 0.5 | 0.5 |
| AO1076 | 0.1 | 0.1 | 0.1 | 0.1 | 0.1 | 0.1 |
| TBPP | 0.1 | 0.1 | 0.1 | 0.1 | 0.1 | 0.1 |
| Properties | | | | | | |
| Predicted Recycle Content, % | 48 | 47 | 48 | 46 | 47 | 44 |
| Δheat v. C1.2, ° C. | 25 | 25 | 23 | 21 | 21 | 15 |
| UL94 VX @ 0.75 mm | nr | nr | nr | nr | nr | ~V1 |
| HDT-Avg (1.8 MPa), ° C. | 139.8 | 139.4 | 137.9 | 135 | 135.6 | 130.6 |
| HDT-Avg (0.45 MPa), ° C. | 145.4 | 145.3 | 144.9 | 141.3 | 141.2 | 135.6 |
| Impact Strength-Avg (N, 5J), J/m | 83.6 | 80.6 | 76.2 | 78.6 | 74.6 | 77 |
| Tensile Strength at Break-Avg, MPa | 72 | 74.1 | 70.9 | 72.9 | 70.2 | 75.2 |
| Nominal Strain at Break-Avg, | 4.32 | 4.49 | 4.68 | 4.39 | 4.41 | 4.1 |

TABLE 2B

| Phosphazene and Other FR Content | | | | | | |
|---|---|---|---|---|---|---|
| Component (wt %) | C2.6 | Ex2.2 | Ex2.3 | C2.7 | C2.8 | Ex2.4 |
| PC (high flow) | 41.2 | 41.2 | 41.2 | 41.2 | 41.2 | 41.2 |
| PC (low flow) | 3.19 | 2.89 | 3.19 | 2.95 | 18.19 | |
| CFR copolymer | 10 | 10 | 10 | 10 | 10 | 10 |
| EXL copolymer | 6 | 6 | 6 | 6 | 6 | 6 |
| XHT copolymer | 15 | 15 | 15 | 15 | | 15 |
| Phosphazene FR | 3.25 | 3.25 | 3.25 | 3.25 | 3.25 | 6.50 |
| RIMAR salt flame retardant | 0.06 | 0.06 | 0.06 | | 0.06 | |
| 3-phenylsulfonylbenezenesulfonic acid potassium salt (KSS) flame retardant | | 0.3 | | 0.3 | | |
| Glass fiber (14 μm) | 20 | 20 | | | | 20 |
| Flat glass fiber | | | 20 | 20 | 20 | |
| INP449 | 0.6 | 0.6 | 0.6 | 0.6 | 0.6 | 0.6 |
| PETS | 0.5 | 0.5 | 0.5 | 0.5 | 0.5 | 0.5 |
| AO1076 | 0.1 | 0.1 | 0.1 | 0.1 | 0.1 | 0.1 |
| TBPP | 0.1 | 0.1 | 0.1 | 0.1 | 0.1 | 0.1 |
| Properties | | | | | | |
| Predicted Recycle Content, % | 44 | 44 | 44 | 44 | 59 | 41 |
| Δheat v. C1.2, ° C. | 14 | 15 | 18 | 16 | 9 | 9 |
| UL94 VX @ 0.75 mm | nr | ~V2 | V0 | nr | nr | V0 |
| HDT-Avg (1.8 MPa), ° C. | 128.9 | 130.2 | 134 | 131.3 | 125.2 | 124 |
| HDT-Avg (0.45 MPa), ° C. | 133.8 | 135.8 | 138.5 | 136 | 129 | 129.2 |
| Impact Strength-Avg (N, 5J), J/m | 75.4 | 78.1 | 91.6 | 73.9 | 104 | 72.6 |
| Tensile Strength at Break-Avg, MPa | 76.9 | 74.1 | 85.4 | 82.6 | 87.3 | 73.2 |
| Nominal Strain at Break-Avg, | 3.66 | 3.97 | 3.73 | 3.75 | 3.43 | 3.27 |

To further increase heat, the content of poly(phosphazene) was varied from 0 wt % to 6.5 wt %. It was theorized that the inclusion of KSS and/or RIMAR salts might make up for some of the lost poly(phosphazene) flame retardant and allow UL94 V0 rating to be maintained. From Table 2, it was apparent that poly(phosphazene) loadings at 0 wt % and 1 wt % were not suitable for obtaining V0 performance at 0.75 mm in such formulations even with inclusion of the FR salts (KSS and/or RIMAR). At a poly(phosphazene) content of 3.25 wt %, half of the compositions were not found to be capable of meeting the UL94 requirements for VX listing (listed as "nr" in the table), while the other half were found to have borderline capability of meeting V2, V1, or V0 criteria. This is indicative of borderline UL94 capability.

Optimization of phosphazene content with varying EXL and CFR copolymer content was then performed; results are shown in Tables 3A and 3B. MVR is melt volume flow rate as determined according to ASTM D1238 at 300° C., 1.2 kilogram (kg) and 360 seconds (s) dwell time; UNNI is unnotched Izod impact energy and NII is notched Izod impact energy at 5 Joules (J) and a 2.75 J pendulum energy as tested in accordance with ASTM D256; TSB is tensile strength to break and TEB is tensile energy to break as determined in accordance with ASTM D638 with an extensometer at 5 millimeters (mm) per minute (min); FM is flexural modulus and FS is flexural strength at break as determined in accordance with ASTM D790 using a 3.2 mm sample at a load of 1.27 megapascals (MPa).

TABLE 3A

| Varying Phosphazene Content with EXL and CFR Content | | | | | | | |
|---|---|---|---|---|---|---|---|
| Component (wt %) | Ex3.1 | Ex2.3 | Ex3.3 | Ex3.4 | Ex3.5 | Ex3.6 | Ex3.7 |
| Phosphazene | 4.50 | 6.50 | 4.50 | 5.12 | 6.50 | 5.76 | 6.14 |
| EXL copolymer | 0.52 | 9.04 | 12.00 | 6.25 | 4.01 | 0.00 | 12.00 |
| CFR copolymer | 13.18 | 2.66 | 1.70 | 6.83 | 7.69 | 12.44 | 0.06 |
| XHT copolymer | 15 | 15 | 15 | 15 | 15 | 15 | 15 |
| SFR100 silicone oil | 0.5 | 0.5 | 0.5 | 0.5 | 0.5 | 0.5 | 0.5 |
| PC (high flow) | 40 | 40 | 40 | 40 | 40 | 40 | 40 |
| PC (low flow) | 5 | 5 | 5 | 5 | 5 | 5 | 5 |
| INP449 | 0.6 | 0.6 | 0.6 | 0.6 | 0.6 | 0.6 | 0.6 |
| TBPP | 0.1 | 0.1 | 0.1 | 0.1 | 0.1 | 0.1 | 0.1 |
| AO1076 | 0.1 | 0.1 | 0.1 | 0.1 | 0.1 | 0.1 | 0.1 |
| PETS | 0.5 | 0.5 | 0.5 | 0.5 | 0.5 | 0.5 | 0.5 |
| Flat glass fiber | 20 | 20 | 20 | 20 | 20 | 20 | 20 |
| Properties | | | | | | | |
| Δheat v. C1.2 (° C.) | 9 | 5 | 13 | 10 | 7 | 8 | 8 |
| HDT (3.2 mm, 1.8 MPa) | 126 | 122 | 130 | 127 | 124 | 125 | 125 |
| HDT (3.2 mm, 0.45 MPa) (anticipated) | 131.3 | 127.3 | 135.3 | 132.3 | 129.3 | 130.3 | 130.3 |
| MVR (300 C., 1.2 kg, 360s) | 14.2 | 7.9 | 9.36 | 10.9 | 11.7 | 12.1 | 10.4 |
| UNNI (5 J) | 681 | 696 | 699 | 709 | 682 | 683 | 690 |
| TSB (5 mm/min) | 114 | 111 | 110 | 115 | 117 | 117 | 110 |

TABLE 3A-continued

Varying Phosphazene Content with EXL and CFR Content

| Component (wt %) | Ex3.1 | Ex2.3 | Ex3.3 | Ex3.4 | Ex3.5 | Ex3.6 | Ex3.7 |
|---|---|---|---|---|---|---|---|
| TEB (5 mm/min) | 2.6 | 2.6 | 2.8 | 2.7 | 2.6 | 2.5 | 2.5 |
| FM (3.2 mm, 1.27) | 6190 | 5870 | 5780 | 5930 | 5990 | 6100 | 5790 |
| FSB (3.2 mm, 1.27) | 174 | 167 | 170 | 173 | 174 | 176 | 168 |
| NII (5J) | 90.8 | 141 | 156 | 144 | 128 | 95.8 | 154 |
| UL94 (0.6 mm), 10 bar | V0 | V0 | V0 | V0 | V0 | V0 | V0 |
| UL94 (0.8 mm), 10 bar | NT | V0 | V0 | V0 | V0 | V0 | V0 |

TABLE 3B

Varying Phosphazene Content with EXL and CFR Content

| Component (wt %) | Ex3.8 | Ex3.9 | Ex3.10 | Ex3.11 | Ex3.12 | Ex3.13 | Ex3.14 |
|---|---|---|---|---|---|---|---|
| Phosphazene | 5.64 | 4.50 | 6.50 | 4.50 | 5.25 | 6.00 | 5.25 |
| EXL copolymer | 7.14 | 3.18 | 0 | 6 | 6 | 6 | 6 |
| CFR copolymer | 5.42 | 10.52 | 0 | 10 | 10 | 10 | 10 |
| XHT copolymer | 15 | 15 | 26.7 | 12.7 | 11.95 | 11.2 | 10.95 |
| SFR100 silicone oil | 0.5 | 0.5 | 0.5 | 0.5 | 0.5 | 0.5 | 1.5 |
| PC (high flow) | 40 | 40 | 40 | 40 | 40 | 40 | 40 |
| PC (low flow) | 5 | 5 | 5 | 5 | 5 | 5 | 5 |
| INP449 | 0.6 | 0.6 | 0.6 | 0.6 | 0.6 | 0.6 | 0.6 |
| TBPP | 0.1 | 0.1 | 0.1 | 0.1 | 0.1 | 0.1 | 0.1 |
| AO1076 | 0.1 | 0.1 | 0.1 | 0.1 | 0.1 | 0.1 | 0.1 |
| PETS | 0.5 | 0.5 | 0.5 | 0.5 | 0.5 | 0.5 | 0.5 |
| Flat glass fiber | 20 | 20 | 20 | 20 | 20 | 20 | 20 |
| Properties | | | | | | | |
| $\Delta$heat v. C1.2 (° C.) | 9 | 12 | 12 | 11 | 9 | 6 | 7 |
| HDT (3.2 mm, 1.8 MPa) | 126 | 129 | 129 | 128 | 126 | 123 | 124 |
| HDT (3.2 mm, 0.45 MPa) (anticipated) | 131.3 | 134.3 | 134.3 | 133.3 | 131.3 | 128.3 | 129.3 |
| MVR (300 C., 1.2 kg, 360s) | 10.3 | 10.1 | 11 | 10.3 | 10.2 | 11.4 | 10.3 |
| UNII (5 J) | 706 | 707 | 652 | 649 | 698 | 660 | 523 |
| TSB (5 mm/min) | 114 | 117 | 117 | 116 | 115 | 117 | 115 |
| TEB (5 mm/min) | 2.7 | 2.7 | 2.5 | 2.8 | 2.7 | 2.7 | 2.6 |
| FM (3.2 mm, 1.27) | 5910 | 5960 | 6270 | 5880 | 5910 | 6130 | 5920 |
| FSB (3.2 mm, 1.27) | 172 | 176 | 170 | 175 | 175 | 174 | 170 |
| NII (5J) | 146 | 132 | 92.6 | 141 | 147 | 142 | 143 |
| UL94 (0.6 mm), 10 bar | V0 | V1 | V0 | V0 | V0 | V0 | V0 |
| UL94 (0.8 mm), 10 bar | V0 | V0 | V0 | V0 | V0 | V0 | V0 |

All of the example compositions in Tables 3A and 3B include at least 4.5 wt % poly(phosphazene). Ex3.9 included 4.5 wt. % poly(phosphazene) and had a UL94 V1 at 0.6 mm, yet was V0 capable at 0.8 mm. All other compositions tested had a UL94 V0 level at both 0.6 mm and 0.8 mm. It was noted that variation of EXL or CFR content in Ex3.1-Ex3.10 did not notably affect UL94 flame performance. In fact, Ex3.10, which did not include EXL or CFR, had a UL94 V0 at both thicknesses. It is thus possible in aspects to not include either CFR or EXL in the formulations as long as the poly(phosphazene) content and XHT are at suitable levels. It may be desirable in certain aspects, however, to include some EXL resin to the composition to increase notched impact toughness as evidenced by the compositions having a low EXL loading (Ex3.1, Ex3.6, Ex3.10) with those having between 3 wt % and 6 wt % EXL loading. Example compositions Ex3.11, Ex3.12 and Ex3.13 include the CFR and EXL PC loading at the C1.2 default level and gradually increase poly(phosphazene) level. These example compositions were found to have desired flame performance at both thicknesses tested and demonstrate reduced HDT as poly (phosphazene) content is increased.

All blends in Tables 3A and 3B include SFR-100, which is a silicone-based flame retardant. Comparing Ex3.14, which includes an increased level of SFR-100 with the remainder of the compositions in Tables 3A and 3B shows that performance does not appreciably change when SFR-100 content is increased to 1.5 wt %. To summarize this data, higher HDT was realized in all examples and ranged from 5 to 13° C. higher than that of unmodified C1.2 resin while achieving a desirable balance of other mechanical properties, flame performance, and expected "green" (PCR-PC) content.

Additional example compositions including XHT copolymer were prepared as set forth in Tables 4A and 4B. Example compositions Ex4.1-4.12 included virgin PC, but it is contemplated that the virgin PC could be replaced with an equivalent amount of PCR-PC (see "potential PCR content"):

TABLE 4A

XHT Compositions

| Description | Units | Ex4.1 | Ex4.2 | Ex4.3 | Ex4.4 | Ex4.5 | Ex4.6 | Ex4.7 |
|---|---|---|---|---|---|---|---|---|
| Fixed components | | | | | | | | |
| Pentaerythritol tetrastearate | wt % | 0.50 | 0.50 | 0.50 | 0.50 | 0.50 | 0.50 | 0.50 |
| Irganox 1076 antioxidant | wt % | 0.10 | 0.10 | 0.10 | 0.10 | 0.10 | 0.10 | 0.10 |
| Tris-isobutylated triphenyl phosphate (TBPP) | wt % | 0.10 | 0.10 | 0.10 | 0.10 | 0.10 | 0.10 | 0.10 |
| TSAN (SABIC INP449) | wt % | 0.60 | 0.60 | 0.60 | 0.60 | 0.60 | 0.60 | 0.60 |
| Varied components | | | | | | | | |
| PC (SABIC Lexan™ ML5221, Mw 21.9k) | wt % | 22.50 | 22.50 | 40.00 | 40.00 | 22.50 | 22.50 | 40.00 |
| PC (SABIC Lexan™ 105, Mw 30.5k) | wt % | 2.50 | 2.50 | 5.00 | 5.00 | 2.50 | 2.50 | 5.00 |
| Phosphazene (Rabitle™ FP110T, Fushimi) | wt % | 5 | 5.50 | 5 | 5.50 | 5 | 5.50 | 5 |
| Flat glass, CSG 3PA-830, Nitto Boseki | wt % | 20 | 20 | 20 | 20 | 10 | 10 | 10 |
| SFR100, silicone based FR, Momentive | wt % | 0.50 | 0.50 | 0.50 | 0.50 | 0.50 | 0.50 | 0.50 |
| XHT high heat PC copolymer, SABIC | wt % | 48.20 | 47.70 | 28.20 | 27.70 | 58.20 | 57.70 | 38.20 |
| Potential PCR content | wt % | 25 | 25 | 45 | 45 | 25 | 25 | 45 |

TABLE 4B

XHT Compositions

| Description | Units | Ex4.8 | Ex4.9 | Ex4.10 | Ex4.11 | Ex4.12 | Ex4.13 | Ex4.14 |
|---|---|---|---|---|---|---|---|---|
| Fixed components | | | | | | | | |
| Pentaerythritol tetrastearate | wt % | 0.50 | 0.50 | 0.50 | 0.50 | 0.50 | 0.50 | 0.50 |
| Irganox 1076 antioxidant | wt % | 0.10 | 0.10 | 0.10 | 0.10 | 0.10 | 0.10 | 0.10 |
| Tris-isobutylated triphenyl phosphate (TBPP) | wt % | 0.10 | 0.10 | 0.10 | 0.10 | 0.10 | 0.10 | 0.10 |
| TSAN (SABIC INP449) | wt % | 0.60 | 0.60 | 0.60 | 0.60 | 0.60 | 0.60 | 0.60 |
| Varied components | | | | | | | | |
| PC (SABIC Lexan™ ML5221, Mw 21.9k) | wt % | 40.00 | 20.00 | 20.00 | 20.00 | 20.00 | 20 (OQ PCR) | 25 (OQ) |
| PC (SABIC Lexan™ 105, Mw 30.5k) | wt % | 5.00 | 2.50 | 2.50 | 2.50 | 2.50 | 5 (WB PCR) | 15 (WB) |
| Phosphazene (Rabitle™ FP110T, Fushimi) | wt % | 5.50 | 5 | 5.50 | 5 | 5.50 | 5.50 | 5.50 |
| Flat glass, CSG 3PA-830, Nitto Boseki | wt % | 10 | 15 | 15 | 15 | 15 | 20.00 | 20.00 |
| SFR100, silicone based FR, Momentive | wt % | 0.50 | 0.50 | 0.50 | 0 | 0 | 0.00 | 0.00 |
| XHT high heat PC copolymer, SABIC | wt % | 37.70 | 55.70 | 55.20 | 56.20 | 55.70 | 48.20 | 33.20 |
| Potential PCR content | wt % | 45 | 23 | 23 | 23 | 23 | 25.00 | 40.00 |

OQ-Optical Quality (from, e.g., CD/DVDs);
WB-from water bottles

The compositions in Tables 4A and 4B were tested for various properties; results are set forth in Tables 4C and 4D. Note that testing for EA4.14 is in progress.

TABLE 4C

Properties of XHT Compositions

| Properties | Units | Ex4.1 | Ex4.2 | Ex4.3 | Ex4.4 | Ex4.5 | Ex4.6 | Ex4.7 |
|---|---|---|---|---|---|---|---|---|
| HDT 0.45 MPA, 3.2 mm | °C. | 151 | 150 | 139 | 136 | 155 | 153 | 144 |
| 0.4 mm VX | UL94 | V0 | V2 | V1/V2 | V2 | V1/V2 | V2 | V2 |
| 0.8 mm VX | UL94 | V0 | V0 | V0 | V0 | V0 | V0 | V0 |
| Notched Izod Impact | J/m | 77.5 | 77.3 | 87.4 | 86.2 | 49 | 47.8 | 56.4 |

TABLE 4C-continued

Properties of XHT Compositions

| Properties | Units | Ex4.1 | Ex4.2 | Ex4.3 | Ex4.4 | Ex4.5 | Ex4.6 | Ex4.7 |
|---|---|---|---|---|---|---|---|---|
| Unnotched Izod Impact | J/m | NT | NT | NT | NT | NT | NT | NT |
| Flexural modulus | MPa | 6140 | 6170 | 6110 | 6260 | 4310 | 4320 | 4230 |
| Flexural strength at break | MPa | 179 | 178 | 174 | 171 | 155 | 153 | 150 |
| Tensile modulus | MPa | 7554 | 7702 | 7698 | 7610 | 5130 | 5196 | 5006 |
| Tensile strength | MPa | 116 | 115 | 115 | 116 | 94 | 93 | 91.4 |
| Tensile elongation at break | % | 2.6 | 2.5 | 2.5 | 2.5 | 4 | 3.9 | 3.8 |
| Melt volume rate (MVR), 300° C., 1.2 kg | cc/10 min | 9.41 | 10.4 | 12.5 | 13.6 | 8.3 | 7.92 | 10.6 |

NT-not tested

TABLE 4D

Properties of XHT Compositions

| Properties | Units | Ex4.8 | Ex4.9 | Ex4.10 | Ex4.11 | Ex4.12 | Ex4.13 | Ex4.14 |
|---|---|---|---|---|---|---|---|---|
| HDT 0.45 MPA, 3.2 mm | ° C. | 143 | 155 | 155 | 155 | 152 | 153 | 140 |
| 0.4 mm VX | UL94 | V2 | V0 | V1/V2 | V0 | V2 | V0 | V0 |
| 0.8 mm VX | UL94 | V0 | V0 | V0 | V0 | V0 | V2 | V2 |
| Notched Izod Impact | J/m | 56.8 | 56.3 | 57.2 | 55.9 | 49 | 73 | NT |
| Unnotched Izod Impact | J/m | NT | NT | NT | NT | NT | 525 | NT |
| Flexural modulus | MPa | 4300 | 5330 | 5300 | 5310 | 5320 | 6160 | NT |
| Flexural strength at break | MPa | 149 | 163 | 163 | 168 | 164 | 176 | NT |
| Tensile modulus | MPa | 5092 | 6366 | 6144 | 5932 | 5910 | 7600 | NT |
| Tensile strength | MPa | 91.9 | 106 | 105 | 106 | 103 | 121 | NT |
| Tensile elongation at break | % | 3.6 | 2.9 | 2.9 | 3.2 | 3.1 | 2.6 | NT |
| Melt volume rate (MVR), 300° C., 1.2 kg | cc/10 min | 11.5 | 7.61 | 7.76 | 8.82 | 8.94 | 8.9 | NT |

NT-not tested

From the results in Tables 4C and 4D it is observed that by removing the CFR resin, optimizing poly(phosphazene) content, and selectively using XHT high heat resin and SFR-100, compositions with an HDT nearing or exceeding 20° C. higher than that of unmodified C1.2 resin are possible.

To summarize, compositions including high loadings of PC content (and expected PCR-PC content) (up to about 50%), a polycarbonate copolymer including polycarbonate and 3,3-Bis(4-hydroxyphenyl)-2-phenyl-2,3-dihydro-isoindol-1-one (PPPBP) (XHT copolymer), and polyphosphazene can provide heat properties (HDT) about 5-20° C. higher than compositions that do not include the XHT copolymer (e.g., C1.2 resin). Other properties of the compositions are similar to those of compositions that do not include the XHT copolymer (e.g., C1.2 resin). In the exemplified compositions, polycarbonate-siloxane copolymer (e.g., EXL resin), a transparent and flame resistant polycarbonate copolymer (e.g., CFR resin), and other FR additives (e.g., SFR-100 silicone oil) may optionally be included. In addition, the compositions may include filler content. Glass loadings from 10-20 wt % have been considered in the exemplified compositions.

The above description is intended to be illustrative, and not restrictive. For example, the above-described examples (or one or more aspects thereof) may be used in combination with each other. Other aspects can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed aspect. Thus, the following claims are hereby incorporated into the Detailed Description as examples or aspects, with each claim standing on its own as a separate aspect, and it is contemplated that such aspects can be combined with each other in various combinations or permutations. The scope of the invention should be determined with reference to the appended claims, along with the full scope of equivalents to which such claims are entitled.

The invention claimed is:

1. A thermoplastic composition comprising:
  (a) from about 20 wt % to about 50 wt % post-consumer recycled polycarbonate (PCR-PC);
  (b) from about 5 wt % to about 25 wt % of a filler component;
  (c) from about 4 wt % to about 7 wt % of a phosphazene component;
  (d) from about 20 wt % to about 65 wt % of a polycarbonate copolymer component comprising bisphenol-A and a monomer comprising one or more of 3,3-Bis(4-hydroxyphenyl)-2-phenyl-2,3-dihydro-isoindol-1-one (PPPBP), 4-4-(3-3-5 trimethylcyclohexane-1-1diyl)diphenol (BPI), 4,4'-(1-Methyl Ethyl) 1-3-cyclohexandiyl) Bis-Phenol (BHPM), 1,1-Bis(4-hydroxy-3- methyl phenyl) cyclohexane (DMBPC); 4-[1-(4-hydroxyphenyl)cyclododecyl]phenol (Red Cross), and combinations thereof; and (e) from about 1 wt % to about 20 wt % one or more additional components.

2. The thermoplastic composition according to claim 1, wherein the thermoplastic composition comprises a heat deflection temperature as measured in accordance with ASTM D648 using a 3.2 millimeter (mm) sample at a load of 0.45 megapascals (MPa) that is at least about 10 degrees Celsius (° C.) higher than that of a substantially identical thermoplastic composition that does not include the polycarbonate copolymer component.

3. The thermoplastic composition according to claim 1, wherein the thermoplastic composition comprises a heat deflection temperature of at least about 130° C. as measured in accordance with ASTM D648 using a 3.2 mm sample at a load of 0.45 MPa.

4. The thermoplastic composition according to claim 1, wherein the thermoplastic composition comprises a UL94 flammability rating of V0 when exposed to short-term conditioning conditions.

5. The thermoplastic composition according to claim 1, wherein the filler component comprises glass fibers.

6. The thermoplastic composition according to claim 1, wherein the composition comprises from about 10 wt % to about 20 wt % of the filler component.

7. The thermoplastic composition according to claim 1, wherein the composition comprises about 5 wt % of the phosphazene component.

8. The thermoplastic composition according to claim 1, wherein the one or more additional components comprise a polycarbonate-siloxane copolymer.

9. The thermoplastic composition according to claim 1, wherein the one or more additional components comprise a transparent and flame resistant polycarbonate copolymer.

10. The thermoplastic composition according to claim 1, wherein the one or more additional components comprise an anti-drip component.

11. The thermoplastic composition according to claim 1, wherein the one or more additional components comprise an additional flame retardant component.

12. The thermoplastic composition according to claim 1, wherein the one or more additional components is selected from the group consisting of: a pigment; a whitening agent; an optical brightener; a surfactant; a processing aid; a thermal stabilizer; a photochemical stabilizer; a mold-release agent; an antioxidant; and combinations thereof.

13. An article comprising the thermoplastic composition according to claim 1.

14. The article according to claim 13, wherein the article is a component of a consumer electronics device.

* * * * *